United States Patent [19]
Jaeger et al.

[11] Patent Number: 5,621,022
[45] Date of Patent: Apr. 15, 1997

[54] USE OF POLYMERIC DYES IN HOT MELT INK JET INKS

[75] Inventors: C. Wayne Jaeger, Beaverton; Loc V. Bui, Portland; Donald R. Titterington, Tualatin; Clifford R. King, Salem, all of Oreg.

[73] Assignee: Tektronix, Inc., Wilsonville, Oreg.

[21] Appl. No.: 381,610

[22] Filed: Jan. 30, 1995

Related U.S. Application Data

[60] Continuation-in-part of Ser. No. 231,598, Apr. 22, 1994, abandoned, which is a division of Ser. No. 981,677, Nov. 25, 1992, Pat. No. 5,372,852.

[51] Int. Cl.$^6$ ..................................................... C09D 11/10
[52] U.S. Cl. ..................... 523/161; 106/20 R; 106/22 R; 524/478; 524/479; 524/487; 524/488
[58] Field of Search ........................ 523/161; 106/20 R, 106/22 R; 524/478, 479, 487, 488

[56] References Cited

U.S. PATENT DOCUMENTS

| | | | |
|---|---|---|---|
| 3,157,633 | 11/1964 | Kuhn | 534/729 |
| 4,167,510 | 9/1979 | Brendle | 534/729 |
| 4,284,729 | 8/1981 | Cross et al. | 521/158 |
| 4,659,383 | 4/1987 | Lin et al. | 106/27 A |
| 4,664,708 | 5/1987 | Allen | 106/22 H |
| 4,684,956 | 8/1987 | Ball | 347/88 |
| 4,705,567 | 11/1987 | Hair et al. | 106/20 D |
| 4,732,570 | 3/1988 | Baumgartner et al. | 8/506 |
| 4,889,560 | 12/1989 | Jaeger et al. | 106/27 R |
| 4,889,761 | 12/1989 | Titterington et al. | 428/195 |
| 5,041,161 | 8/1991 | Cooke et al. | 106/22 A |
| 5,098,475 | 3/1992 | Winnik et al. | 106/22 D |
| 5,102,448 | 4/1992 | Parton et al. | 106/22 A |
| 5,145,518 | 9/1992 | Winnik et al. | 106/21 E |
| 5,176,745 | 1/1993 | Moore et al. | 106/22 R |
| 5,250,107 | 10/1993 | Bares | 106/20 R |
| 5,259,874 | 11/1993 | Miller et al. | 106/20 R |
| 5,271,764 | 12/1993 | Winnik et al. | 106/21 A |
| 5,372,852 | 12/1994 | Titterington et al. | 427/288 |

*Primary Examiner*—Paul R. Michl
*Assistant Examiner*—John J. Guarriello
*Attorney, Agent, or Firm*—Ralph D'Alessandro; William A. Simons

[57] ABSTRACT

A phase change ink composition is disclosed wherein the ink composition utilizes polymeric dyes in combination with a selected phase change ink carrier composition.

52 Claims, 1 Drawing Sheet

USE OF POLYMERIC DYES IN HOT MELT INK JET INKS

DESCRIPTION OF RELATED PATENT APPLICATIONS

This application is a continuation-in-part application of U.S. patent application Ser. No. 08/231,598 filed Apr. 22, 1994 and now abandoned, which is a divisional application of U.S. patent application Ser. No. 07/981,677, filed Nov. 25, 1992, now U.S. Pat. No. 5,372,852, issued Dec. 13, 1994. Both this issued U.S. patent and pending U.S. patent application are incorporated herein by reference in their entirety.

BACKGROUND OF THE INVENTION

1. Field of the Invention

The present invention generally relates to selected phase change ink compositions containing certain polymeric dyes in combination with certain phase change ink carrier compositions.

2. Brief Description of the Related Art

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops.

The phase change inks generally comprise a phase change ink carrier composition which is combined with a phase change ink compatible colorant. Preferably, a colored phase change ink will be formed by combining the above-described ink carrier composition with compatible subtractive primary colorants. The subtractive primary colored phase change inks of this invention comprise four component dyes, namely, cyan, magenta, yellow and black. U.S. Pat. Nos. 4,889,560 and 5,372,852 teach the subtractive primary colorants employed typically may comprise dyes from the classes of Color Index (C.I.) Solvent Dyes, Disperse Dyes, modified Acid and Direct Dyes, and a limited number of Basic Dyes.

Phase change inks are desirable for ink jet printers since they remain in a solid phase at room temperature, during shipping, long-term storage, and the like. Also, the problems associated with nozzle clogging due to ink evaporation are largely eliminated, thereby improving the reliability of ink jet printing. Furthermore, in prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

Separately, polymeric dyes have been used in gravure and flexographic printing industries. Specifically, as mentioned in U.S. Pat. No. 5,176,745, a specific class of polymeric dyes have been employed to make aqueous ink compositions where the polymeric dye is solubilized into the aqueous ink composition by means of a counter ion to form a soluble salt.

BRIEF SUMMARY OF THE INVENTION

The present invention combined this specific class of polymeric dyes disclosed in U.S. Pat. No. 5,176,745 as colorants with the specific types of phase change carrier compositions that were disclosed in U.S. Pat. Nos. 4,889,560 and 5,372,852. It has been found that this new combination results in an ink jet ink that possesses several unexpected advantages, including:

(1) These polymeric dyes are very soluble in the phase change carrier composition and possess high water fastness and high resistance to "bleeding" or weeping of the color from the carrier composition when printed samples are subjected to high temperatures or humidity.

(2) These polymeric dyes are thermally stable in the carrier composition. This is important because the resulting phase change ink compositions may remain molten for weeks at a time in the ink jet printer.

(3) These polymeric dyes also act as a plasticizer for the formulation. This enables the formulator to replace at least a portion of the commercial plasticizer that is normally part of the formulations disclosed in the inks of U.S. Pat. Nos. 4,889,506 and 5,372,852.

(4) These polymeric dyes are compatible with each other and with most conventional powdered dyes currently used in phase change ink compositions. Thus, mixtures of inks of different colors do not form a precipitate when mixed together. This is important because, during the purging and wiping procedures that are used in maintenance of the ink jet device, all four colors of ink are mixed together on the faceplate of the jet array. Any precipitates caused by reactions between inks or dyes have the potential to clog the orifices of the jets. This compatibility also allows for the mixing of these polymeric dyes with powdered dyes of the same primary color into the same ink composition to achieve high color strengths that would not be possible with either dye type by itself.

One aspect of the present invention is directed to a phase change ink composition comprising a composition comprising a fatty amide-containing material, said fatty amide-containing material comprising a tetra-amide compound and a mono-amide compound and a compatible colorant, said phase change ink composition being in a solid phase at ambient temperature and in a liquid phase at elevated operating temperature, said ink composition having a high degree of lightness and chroma, and being rectilinearly light transmissive in a thin film of substantially uniform thickness, wherein said colorant is selected from a group consisting of (1) an organic chromophore having a polyoxyalkylene substituent and (2) an organic chromophore having a polyoxyalkylene substituent and a carboxylic acid or nonreactive derivative thereof covalently bonded to the polyoxyalkylene substituent.

A second aspect of the present invention is directed to a selective phase change ink composition, which comprises a phase change ink colorant composition and a phase change ink carrier composition, said selective phase change ink composition having (a) predetermined fluidics and mechanical properties which meet the parameters needed for application to an intermediate transfer surface at an elevated temperature in a liquid state and in a predetermined pattern, where it is transferred and fixed onto a substrate to form a printed substrate, (b) a compressive yield strength which will allow the ink to flow in a ductile manner when external compressive forces are applied thereto, and sufficient internal cohesive strength to resist failure when the ink is fixed to said substrate, (c) a high degree of ductility on said substrate after said transfer and fixing, and (d) a high degree of lightness and chroma for thin films of uniform thickness thereof, wherein said colorant is selected from the group consisting of (1) an organic chromophore having a polyoxyalkylene substituent and (2) an organic chromophore having a polyoxyalkylene substituent and a carboxylic acid or nonreactive derivative thereof covalently bonded to the polyoxyalkylene substituent.

A third aspect of the present invention is directed to a phase change ink composition comprising a phase change ink carrier compositions comprising a tetra-amide compound and a mono-amide compound and a compatible colorant, said ink composition being solid phase at ambient temperature and in a liquid phase at elevated operating temperature, and having a high degree of lightness and chroma and being rectilinearly light transmissive in thin films of substantially uniform thickness, wherein the $C_{ab}^*$ value of a substantially uniform thin film of about 5–20 micron thickness, of subtractive primary Yellow, magenta and cyan color phase change ink compositions are at least about 40 for said yellow ink composition, at least about 50 for said magenta ink composition, and at least about 30 for said cyan ink composition, and wherein the $L^*$ value of a substantially uniform thin film of about 5–20 micron thickness, of a black color phase change ink is not more than about 35, wherein said colorant is an selected from the group consisting of an organic chromophore having a polyoxyalkylene substituent and (2) an organic chromophore having a polyoxyalkylene substituent and a carboxylic acid or non-reactive derivative thereof covalently bonded to the polyoxyalklene substituent.

BRIEF DESCRIPTION OF PREFERRED EMBODIMENTS

Figure 1:
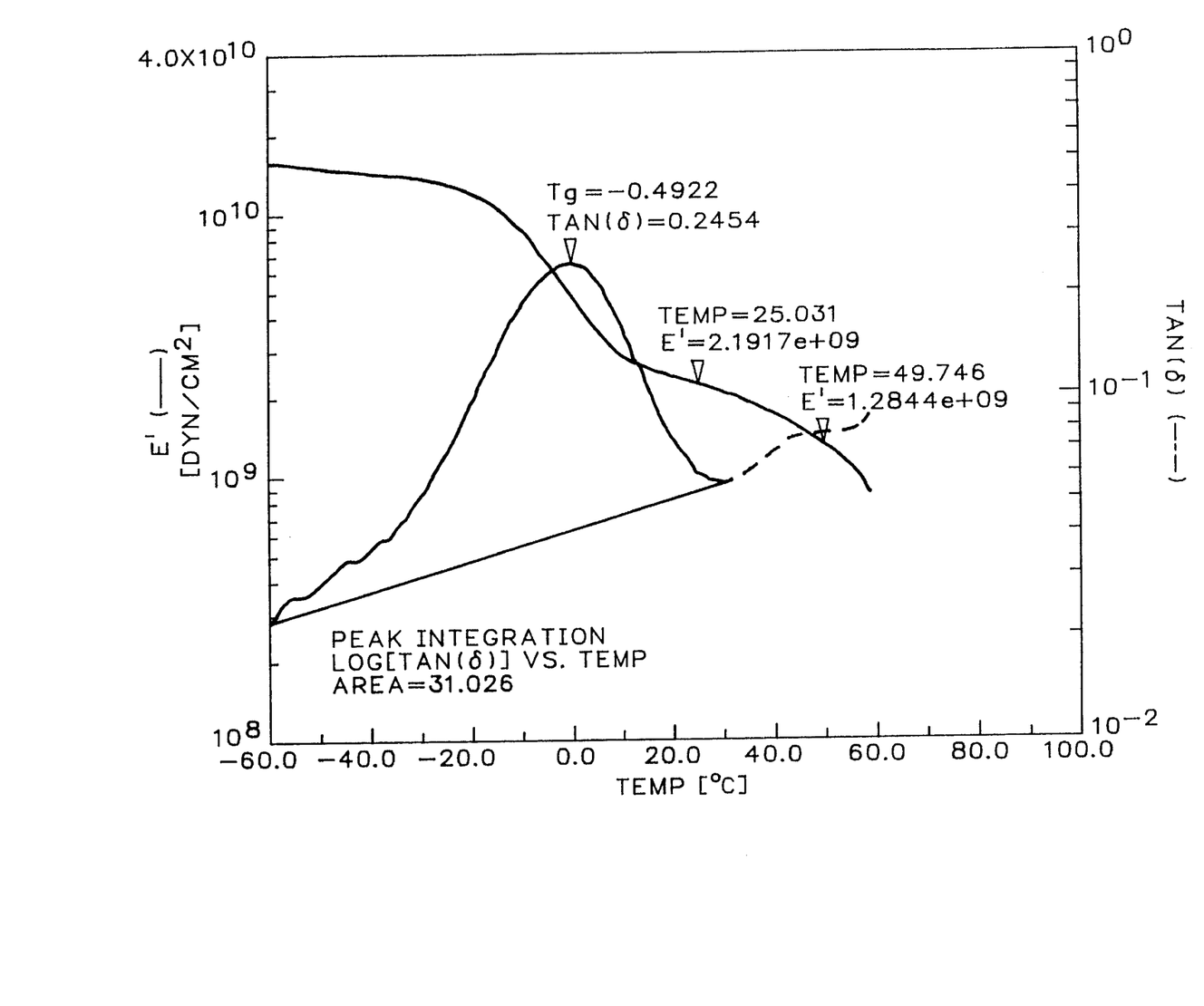
The FIGURE is a DMA curve for the Formulation of Example 1.

This invention comprises selective phase change ink compositions for use in a process by which such compositions are indirectly applied via an intermediate transfer surface to a final receiving surface or substrate. The phase change ink compositions of the instant invention comprise a specific phase change ink colorant and a specific phase change ink carrier composition. The specific phase change ink carrier composition is formulated so that it produces a selective ink composition having predetermined fluidics and mechanical properties which meet the parameters required for the indirect application via an intermediate transfer surface of the ink composition to a final receiving substrate.

The ink compositions of the present invention includes selected polymeric dyes as one or more colorants. These colorants themselves are characterized by three primary components: (1) an organic chromophore having (2) a polyoxyalkylene substituents, and optionally (3) a carboxylic acid or nonreactive derivative thereof covalently bonded to the polyoxyalkylene substituent.

A wide variety of polyoxyalkylene substituted organic chromophores and their preparation are well known in the art. These materials can be represented by the general formula:

where A is an organic chromophore, Y is a straight or branched polyoxyalkylene substituent comprised of from 1–200 radicals of $C_{2-18}$ alkylene oxides. The chromophore is covalently bonded to the polyoxyalkylene substituent by a linking group such as N, $NR_3$, O, S, $SO_2$, $SO_2N$, $SO_2NR_3$, $CO_2$, CON, or $CONR_3$ where $R_3$ is H, $C_1-C_{12}$ alkyl, phenyl, or benzyl. Preferably, the linking group is N, $NR_3$, O, $SO_2N$, or $SO_2NR_3$. Two polyoxyalkylene substituents may be bonded to the chromophore through a trivalent linking group. The letter "p" presents the number of polyoxyalkylene chains per chromophore and may be from 1–6, preferably 1–4.

Preferably, the polyoxyalkylene substituents are primarily comprised of from 3 to 50 radicals of ethylene oxide, propylene oxide or random and block copolymers thereof. Minor amounts of glycidol, butylene oxide, and other compatible monomers may also be present.

A wide variety of organic chromophores are suitable for use in the present invention. Examples of useful chromophores include: nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, azamethines or indigoid chromophore groups. Of particular interest are azo, methine, triphenylmethanes, and anthraquinone chromophores. While metal containing chromophores, such as phthalocyanines, may also be employed, from an environmental perspective, their use is less desirable.

Synthesis of organic chromophores containing polyoxyalkylene substituents are disclosed in Kuhn, U.S. Pat. No. 3,157,633, Brendle, U.S. Pat. No. 4,167,510, Cross et al., U.S. Pat. No. 4,284,729, and Baumgarner et al., U.S. Pat. No. 4,732,570, incorporated by reference herein in their entireties.

Preferably, the polyoxyalkylene substituent has a pendant or terminal nucleophilic functionality selected from OH, $NH_2$, $NHR_2$, and SH, wherein $R_2$ is $C_{1-18}$ alkyl, preferably $C_{1-8}$ alkyl, which reacts to create the bond. In a more preferred embodiment, the nucleophilic functionality is OH or $NH_2$ which is attached to a primary carbon.

The carboxylic acid or nonreactive derivative thereof may be incorporated into the colorant in a number of ways. In one embodiment, a cyclic acid anhydride is reacted with the nucleophilic functionality of the polyoxyalkylene substituent to provide an ester, amide, or thio ester bond and a pendant carboxyl group. Suitable cyclic acid anhydrides or equivalent derivatives include succinic anhydride, maleic anhydride, phthalic anhydride, trimellitic anhydride, and dimethyl succinate. In a preferred embodiment, the oleophilic character of the colorant is increased by providing an anhydride with a substituent having up to 30 carbon atoms. By way of example, the substituent may be $C_1-C_{30}$ alkyl, cycloalkyl, or alkenyl, phenyl, naphthyl, or benzyl. Particular useful anhydrides include: alkenyl succinic anhydrides such as octenyl succinic anhydride (OSA), dodecenyl succinic anhydride (DDSA), and octadecenyl succinic anhydride (ODSA); itaconic anhydride, citraconic anhydride, succinic anhydrides bonded to rosins and maleated rosins such as "UNIREZ" available from Union Carbide.

Alternatively, a polycarboxylic acid derivative such as a diacyl halide may be reacted with the nucleophilic functionality of the polyoxyalkylene substituents to form an ester, amide, or thio ester. Standard esterification techniques known in the art may be used followed by hydrolysis of the unreacted acyl halide to form a carboxylic acid functionality.

A further embodiment of the invention may be realized by the reaction of a polycarboxylic acid, such as malonic acid, adipic acid, and sebacic acid with the nucleophilic functionality of the polyoxyalkylene substituent to create an ester, amide or thio ester.

The above-mentioned cyclic acid anhydrides, acyl halides, and dicarboxylic acids may be substituted with CN, $NO_2$, halogens, and $SO_3$ without deviating from the scope of the invention.

The colorant may be preferably represented by the formula:

$$A-\{Y-X-C(O)-R_1-C(O)OH\}_p$$

where A is an organic chromophore; Y is a polyoxyalkylene substituent having from 1 to 200 alkylene oxide radicals of $C_{2-18}$ alkylene oxides; X is a nucleophile selected from O, $NR_2$, and S, where $R_2$, is H or $C_{1-18}$ alkyl; $R_1$ is selected from alkylene, alkenylene, phenylene, respectively and phenylene-alkylene, any of which may optionally be substituted with alkyl, alkenyl, or aryl, provided that the total number of carbon atoms is from 2 to 30; and p is an integer from 1 to 6. The term "non-reactive derivative" of the pendent carboxylic acid group as defined for the present specification and claims means ester and amide derivatives of said carboxylic acids.

A phase change ink composition incorporating from 0.1 to 15 wt. % of the colorant, preferably from 0.5 to 8 wt. %, may be provided.

These polymeric dye colorants are available from Milliken & Company. Examples include Milliken Ink Yellow 869, Milliken Ink Blue 92, Milliken Ink Rod 357, Milliken Ink Yellow 1800, Milliken Ink Black 8915-67. Other yellow, cyan, magenta and black polymeric dyes are within the scope of this invention and may be utilized. These polymeric dyes may be used alone or in combination with conventional colorants disclosed in U.S. Pat. No. 5,372,852 to make individual phase change inks of each primary color. In addition, phase change inks that contain polymeric dyes may be used in a ink jet printer with phase change inks that contain conventional powdered dyes.

The modified base phase change ink carrier composition typically comprises a fatty amide-containing material. The fatty amide-containing material of the modified phase change ink carrier is a tetra-amide compound. The preferred tetra-amide compounds for producing the modified phase change ink carrier composition are dimer acid-based tetra-amides which preferably include the reaction product of a fatty acid, a diamine (ethylene diamine) and a dimer acid. For purposes of this invention, the term "dimer acid" preferably means a hydrogenated oleic acid dimer product. A preferred example of such a dimer acid is a product known as Empol 1008 Dimer Acid, manufactured by the Emery Division of Henkel Corporation of Cincinnati, Ohio. Fatty acids having from 10 to 22 carbon atoms are preferably employed in the formation of the dimer acid-based tetra-amide. These dimer acid-based tetra-amides are produced by Union Camp and comprise the reaction product of ethylene diamine, dimer acid, and the following fatty acids: decanoic acid (Union Camp X3203-23), myristic acid (Union Camp X3202-56), stearic acid (Union Camp X3138-43, X3164-23, X3202-44, X3202-46, X3222-655, X3261-37, X3261-53, and X3290-72), and docosanoic acid (Union Camp X3202-36). For the purposes of this invention, the most preferred dimer acid based tetra-amide is the reaction product of dimer acid, ethylene diamine and stearic acid in the stoichiometric ratio of 1:2:2. Stearic acid is the preferred fatty acid reactant because its adduct with dimer acid and ethylene diamine has the lowest viscosity of the dimer acid based tetra-amides. Its ingredients also are the most readily available and, therefore, lowest in cost.

The fatty amide-containing material can also comprise a mono-amide. In fact, in the preferred case, the phase change ink carrier composition comprises both a tetra-amide compound and a mono-amide compound. The mono-amide compound typically comprises either a primary or secondary mono-amide, but is preferably a secondary mono-amide. Of the primary mono-amides, stearamide, such as Kemamide S, manufactured by Witco Chemical Company, can be employed herein. As for the secondary mono-amides, behenyl benenamide (Kemamide EX-666), and stearyl stearamide (Kemamide S-180), all manufactured by Witco Chemical Company, are extremely useful mono-amides. However, stearyl stearamide (Kemamide S-180) is the mono-amide of choice in producing the modified phase change ink carrier composition of the present invention.

The preferred fatty amide-containing compounds of this invention comprise a plurality of fatty amide materials which are compatible with each other. Typically, even when a plurality of fatty amide-containing compounds are employed to produce the modified phase change ink carrier composition, the modified carrier composition has a substantially single melting point transition. The melting point of the phase change ink carrier composition is preferably at least about 85° C.

The preferred modified phase change ink carrier composition comprises a tetra-amide and a mono-amide. The weight ratio of the tetra-amide to the mono-amide in the preferred instance is from about 2:1 to about 1:10, and more preferably, from about 1:1 to about 1:3.

Various modifying agents can be added to a phase change ink carrier composition. However, only certain of these modifying agents which are employed in a manner which will produce a phase change ink composition having the properties which meet the parameters required for indirect application to the substrate fall within the scope of this invention. For example, a preferred modifying agent includes certain tackifiers. The preferred tackifiers encompass those which are compatible with fatty amide-containing materials. These include, for example, KE-311 Resin, a glycerol ester of hydrogenated abietic (rosin) acid made by Arakawa Chemical Industries, Ltd., Foral 85, a glycerol ester of hydrogenated abietic (rosin) acid, Foral 105, a pentaerythritol ester of hydroabietic (rosin) acid, Cellolyn 21, a hydroabietic(rosin) alcohol ester of phthalic acid, all manufactured by Hercules Chemical Company, Nevtac 2300 and Nevtac 80, synthetic polyterpene resins manufactured by Neville Chemical Company, and Wingtack 86, a modified synthetic polyterpene resin manufactured by Goodyear Chemical Company. The most preferred tackifier, however, is KE-311.

Another of the preferred modifying agents which can be added to the formulation are certain plasticizers. For instance, many of the phthalate ester plasticizers sold by Monsanto under the traded name "Santicizer" are suitable for this purpose. However, the preferred plasticizer is Santicizer 278, which is the mixed di-ester of phthalic acid with benzyl alcohol and "Texanol".

Other additives may be combined with the phase change ink carrier composition. In a typical phase change ink chemical composition antioxidants are added for preventing discoloration of the carrier composition. The preferred antioxidant materials can include Irganox 1010 manufactured by Ciba Geigy; and Naugard 76, Naugard 445, Naugard 512, and Naugard 524 manufactured by Uniroyal Chemical Company. However, the most preferred antioxidant is Naugard 445.

While the modifying agents mentioned above are used for the preferred embodiments of this invention, other materials with similar properties can be combined with or used to produce different phase change ink compositions with mechanical and fluidics properties similar to those outlined above. These other materials can include paraffins, microcrystalline waxes, polyethylene waxes, ester waxes, oligomers or low molecular weight polymers and copolymers such as ethylene/vinyl acetate (EVA), ethylene/acrylic acid copolymers, EVA/acrylic acid copolymers, ionomers, copolymers of acrylic acid with polyamides, and the like.

In a preferred case, the phase change ink carrier composition comprises a tetra-amide and a mono-amide compound and a modifying agent which includes a tackifier, a plasticizer, and an antioxidant. The preferred compositional ranges of this phase change ink carrier composition are as follows: from about 10 to about 50 weight percent of a tetra-amide compound, from about 30 to about 80 weight percent of a mono-amide compound, from about 0 to about 40 weight percent of a tackifier, from about 0 to about 30 weight percent of a plasticizer and about 0 to about 2 percent of an antioxidant.

Thin films of uniform thickness of the phase change ink composition on the final receiving substrate when cooled to the ambient temperature must be ductile and retain sufficient flexibility so the image will not fracture upon bending, while possessing a high degree of lightness, chroma, transparency and thermal stability.

It has been determined in an indirect application process employing an intermediate transfer surface that a phase change ink composition must have certain fluidics and mechanical properties in order to produce a printed substrate of high quality. These desirable properties of the phase change ink compositions of this invention in the solid state are specified and measured by using several analytical techniques. One such technique is dynamic mechanical analyses (DMA). DMA is a technique capable of measuring the viscoelastic properties of a material and identifying the material's elastic and viscous components. The measurements are made by subjecting the ink composition to an alternating (oscillatory or dynamic) strain and simultaneously measuring the alternating stresses and phase angles at different frequencies and temperatures. The dynamic stress($\sigma^*$) of an ink composition can be separated into two components. These are the "elastic stress" component which is the magnitude of the portion of the applied force in phase with the applied strain, and the "viscous stress" component, which is the magnitude of the portion of the applied force out of phase with the applied strain. The dynamic modulus ($E^*$) can be determined from the ratio of dynamic stress over strain. Correspondingly, it can be broken down into the in-phase component of the modulus, E', and the out-of-phase component of the modulus, E". E' defines the energy stored in a specimen under an applied strain. E' is determined by the equation $E' = \sigma_o/\epsilon_o (\cos\delta)$. E" defines the energy loss due to viscous dissipation under an applied strain. E" is determined by the equation $E" = \sigma_o/\epsilon_o (\sin\delta)$.

The phase angle ($\delta$) is the lag in the measured stresses to an applied strain due to the viscoelastic nature of the material. The loss tangent (tan $\delta$) is the ratio of loss modulus over storage modulus. Tan $\delta$ is often referred to as the dissipation (damping) factor, i.e., the ratio of energy dissipated per cycle to the maximum potential energy stored during a cycle. Finally, the glass transition temperature ($T_g$) is a temperature at which there is a large drop in modulus, about 0.5 to about 3 orders of magnitude, accompanied by a definite peak of the tan $\delta$. Below the $T_g$, the material behaves like a brittle solid. At the $T_g$, the material acts like a leathery solid and is capable of dissipating energy. Above the $T_g$, the material is similar to a rubbery solid. Dynamic properties are usually plotted in terms of E', E" and tan $\delta$ as a function of temperature at a constant frequency or as a function of frequency at a constant temperature. Through the time-temperature equivalence principle discussed in the book entitled, "Viscoelastic Properties of Polymers", Chapter 11, pages 264–320, 3rd Edition by John D. Ferry; it is understood that the effect of changing temperature will correspond to a shift along the frequency axis for all relaxation processes, without appreciable change in magnitude of all of these relaxation processes.

Another of the mechanical analytical techniques mentioned above is compressive yield testing on bulk samples of the phase change ink compositions. Yield stress is the point on the stress-strain curve at which the material continues to deform without an increase in stress. This is important in the printing process mentioned above since it determines the pressure needed to spread the solid, malleable ink droplets into a continuous thin film during the transfer process.

There are various types of deformation the ink undergoes in compression as a function of temperature or rate. An ink can be classified as being brittle if it fails by the shearing and fracturing of the molecular bonds. This is typified by low elongation (which is directly proportional to strain) and moderate to high stress. Since the integration of the area under the stress-strain curve is a measure of the toughness of the material, a brittle material is strong, but not tough. The brittle behavior is detrimental to the durability of the ink on substrates because it is both low in elongation (i.e., not very ductile or flexible) and toughness (i.e., the ability to dissipate energy).

An ink is considered to be ductile if it fails by sliding the molecules over each other and flowing. This is typified by high elongation and toughness. Ductile behavior is desirable for a printing process involving transfer and fusing or fixing because it allows the ink to spread by flowing under an applied pressure without fracturing.

Shear banding is the transition between the ductile and weak behavior, where the ink loses its cohesive strength. Shear bands are typified by 45° angle criss-crossed bands that indicate the ink is weakening. Weak behavior is characterized by the crumbling behavior of the ink. This is due to the loss in cohesive strength of the material. It is theorized that this occurs once short molecules have flowed past one another at high elongation. The weak behavior is to be avoided during the image transfer and fusing steps because it leads to poor durability of the ink on substrates, poor rectilinear light transmission of the ink, and poor transfer efficiency during printing.

The phase change ink compositions as finally applied to the substrate make a finished print exhibiting excellent color properties. Thin films of uniform thickness of the phase change ink composition are rectilinearly light transmissive and exhibit exemplary $C^*ab$ and $L^*$ values as hereinafter described.

Another important property of phase change inks is viscosity. The viscosity of the molten ink must be matched to the requirements of the ink jet device and optimized versus other physical properties of the ink. For purposes of this invention, the viscosity of the phase change ink is measured on a Bohlin CS-50 rheometer using a C-25 cup and bob. It is preferred that the viscosity of the phase change ink carrier composition at 140° C., and in turn the ink composition of this invention, is from about 5 to about 30 centipoise, more preferably from about 10 to about 20 centipoise, and most preferably from about 11 to about 15 centipoise.

As previously indicated, the subject phase change ink formed from the phase change ink carrier composition exhibit excellent physical properties. For example, the subject phase change ink, unlike prior art phase change inks, exhibits a high level of lightness, chroma, and rectilinear light transmissivity when utilized in a thin film of substantially uniform thickness, so that color images can be conveyed using overhead projection techniques. Furthermore, the preferred phase change ink compositions exhibit the preferred mechanical and fluidics properties mentioned above when measured by DMA, compressive yield testing and viscometry, and more importantly, work well when used in the indirect printing process described in co-pending U.S. Pat. No. 5,389,958 issued Feb. 14, 1995, and assigned to the assignee of the present invention. This patent is incorporated herein by reference in its entirety.

The transmission and reflectance spectra for each of the phase change inks used in the process of this invention were evaluated on a commercially available spectro-photometer, the ACS Spectro-Sensor II, in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks used in the process and as a part of this invention, measurement data were reduced, via tristimulus integration, following ASTM E308 (Standard Method for Computing the Colors of Objects using the CIE System) in order to calculate the 1976 CIE $L^*$ (Lightness), $a^*$ (redness-greenness), and $b^*$ (yellowness-blueness) CIELAB values for each phase change ink sample. In addition, the values for CIELAB Psychometric Chroma, $C_{ab}^*$, and CIELAB Psychometric Hue Angle, were calculated according to publication CIE15.2, Colorimetry (Second Edition, Central Bureau de la CIE, Vienna, 1986).

Unlike conventional phase change ink carders, the nature of the phase change ink without colorant used in the process of the present invention is such that thin films of substantially uniform thickness exhibit a relatively high $L^*$ value. For example, a substantially uniform thin film of about 5–20 micron thickness of the phase change ink of this invention preferably has an $L^*$ value of at least about 65, more preferably at least about 75, and most preferably at least about 85.

The phase change inks used herein have a relatively high $C^*ab$ value when measured as a thin film of substantially uniform thickness. Previously, conventional phase change inks have had a very low degree of rectilinear light transmissivity, even in thin films of substantially uniform thickness. The phase change ink composition used in the process of this invention has $C^*ab$ values, when applied as a substantially uniform thin film of about 5–20 micron thickness with subtractive primary yellow, magenta and cyan color phase change ink compositions, that preferably are at least about 40 for said yellow ink composition, at least about 50 for said magenta ink composition, and at least about 30 for the cyan ink composition.

It is also important that the black color phase change ink component be at a minimum light transmissivity level so that the color intensity of the ink is maximized. Accordingly, the $L^*$ value of a substantially uniformly thin film of about 5–20 microns thickness of a black color phase change ink is preferably not more than about 35, more preferably not more than about 30, and most preferably not more than about 25.

The respective phase change ink and ink carrier compositions, when transferred to the final substrate in a thin film, are quite durable. One indication of durability is abrasion resistance. For purposes of this invention, abrasion resistance is determined by testing a finished print sample of the phase change ink produced from the carrier composition in a Teledyne Taber Abrader, Model 5130, utilizing CS-230 Abrasion wheels loaded with 500 gram weights. The abrasion wheels are resurfaced after each sample with an S-11 resurfacing disk. Samples printed on paper were tested according to ASTM D406(F84 (Standard Test Method For Abrasion Resistance of Organic Coatings by the Taber Abrader). Samples printed on light transmissive thin films were tested using ASTM D1304Q-85 (Standard Test Method For Resistance of Transparent Plastics to Surface Abrasion). Print samples were tested as described above, and the results of those tests demonstrated excellent abrasion resistance.

A further test employed to evaluate the durability of phase change inks and ink carrier compositions is an offset transfer or blocking test. This determines whether the phase change ink printed on a substrate will adhere to an adjacent substrate at ambient or elevated temperatures when the printed products are stacked one on top of the other. The blocking test is conducted using an indirect transfer method by printing samples of the phase change ink produced from the carrier composition onto a paper or thin film substrate and placing that substrate in a manila folder under a one pound piece of aluminum, about 8.5 inches wide and about 11 inches long to evenly distribute the weight of a 10 pound block. These printed samples are placed in an oven for 24 hours at a constant temperature of about 60° C. Print samples of the phase change ink of the present invention, subjected to the above described blocking test showed no blocking.

The above-defined DMA properties of the phase change ink compositions were experimentally determined. These dynamic measurements were done on the Rheometrics Solids Analyzer (RSA II) manufactured by Rheometrics, Inc. of Piscataway, N.J., using a dual cantilever beam geometry. The dimensions of the sample were about 2.0±1.0 mm thick, about 6.5±0.5 mm wide, about 54.0±1.0 mm long. A time/cure sweep was carried out under a desired force oscillation or testing frequency of about 1 Hz and an auto-strain range of about $1.0 \times 10^{-5}$% to about 1%. The temperature range examined was about −60° to about 90° C. The preferred phase change ink compositions typically are (a) ductile or flexible at a temperature of about −10° to about 80° C., (b) have a temperature range for the glassy region from about −100° to 40° C., the value of E' being from about $1.5 \times 10^9$ to $1.5 \times 10^{11}$ dynes/cm$^2$, (c) have a temperature range for the transition region from about −50° to about 60° C., (d) have a temperature range for the rubbery region of E' from about −10° to 100° C., the value of E' being from about $1.0 \times 10^6$ to about $1.0 \times 10^{11}$ dynes/cm$^2$, and (e) have a temperature range for the terminal region of E' from about 30° to about 160° C. Furthermore, the glass transition temperature range of the phase change ink compositions are from about −40° to about 40° C., the temperature range for integrating under the tan δ peak of the phase change ink composition is from about −80° to about 80° C. with integration values ranging from about 5 to about 40, and the temperature range for the peak value of tan δ of the phase change ink is from about −40° to about 40° C. with a tan δ of about $1.0 \times 10^{-2}$ to about $1.0 \times 10$ at peak.

The ink utilized in the process and system of the instant invention is preferably initially in solid form and is then changed to a molten state by the application of heat energy to raise the temperature from about 85° C. to about 150° C. Elevated temperatures above this range will cause degradation or chemical breakdown of the ink. The molten ink is then applied in raster fashion from the ink jets in the printhead to the exposed surface of the liquid layer forming the intermediate transfer surface, where it is cooled to an intermediate temperature and solidifies to a malleable state in which it is transferred to the final receiving surface via a contact transfer by entering the nip between the pressure and fusing roller and the liquid layer forming the intermediate transfer surface on the support surface or drum. This intermediate temperature where the solidified ink is maintained in its malleable state is between about 30° C. to about 80° C.

Once the solid malleable ink image enters the nip, it is deformed to its final image conformation and adheres or is fixed to the final receiving substrate either by the pressure exerted against ink image on the final receiving substrate by the pressure and fusing roller alone, or by the combination of the pressure and heat supplied by appropriate heating apparatus. Additional heating apparatus could optionally be employed to supply heat to facilitate the process at this point. The pressure exerted on the ink image is between about 10 to about 2000 pounds per square inch (psi), more preferably between about 500 to about 1000 psi, and most preferably between about 750 to about 850 psi. The pressure must be sufficient to have the ink image adhere to the final receiving substrate and be sufficiently deformed to ensure that light is transmitted through the ink image rectilinearly or without significant deviation in its path from the inlet to the outlet, in those instances when the final receiving substrate is a transparency. Once adhered to the final receiving substrate, the ink image is cooled to ambient temperature of about 20° to about 25° C. The ink comprising the ink image must be ductile, or be able to yield or experience plastic deformation without fracture when kept above the glass transition temperature. Below the glass transition temperature the ink is brittle. The temperature of the ink image in the ductile state is between about −10° C. and to about the melting point, or less than about 85° C.

The following examples are illustrative of the phase change ink formulations that can be successfully employed both with and without a liquid intermediate transfer surface, without any intent to limit the invention to the specific materials, process or structure employed. All parts and percentages are by weight unless explicitly stated otherwise.

EXAMPLE 1

(Yellow Ink Using Polymeric Dye)

In a stainless steel beaker were combined KEMAMIDE S-180 stearyl stearamide (568.7 g), Arakawa KE-311 resin (275.4 g), antioxidant Naugard-445 (2.51 g), plasticizer Santicizer 278 (79.3 g) and Milliken Ink Yellow 869 polymeric dye (60.0 g). The components were melted together in an oven at 135° C. over 2 hours. After melting, the beaker was removed from the oven and placed in a temperature regulated heating mantle and stirred for 1 hour at about 110° C. To this stirred mixture was added 308.3 g of UNIREZ 2970 (a dimer acid-based tetraamide (TA) material manufactured by Union Camp) in several portions at a rate so as to avoid freezing the mixture. After addition of the TA was complete, the mixture was stirred at 110° C. for two (2) hours until the TA was completely dissolved. The molten phase change ink was filtered through a heated Mott apparatus (available from Mott Metallurgical) using #3 Whatman filter paper and a pressure of 15 psi. The filtered phase change ink was poured into molds and allowed to solidify to form solid ink sticks.

EXAMPLE 2

(Cyan Ink Using Polymeric Dye)

In a stainless steel beaker were combined KEMAMIDE S-180 stearyl stearamide (168 g), Arakawa KE-311 resin (108 g), antioxidant Naugard-445 (0.82 g), plasticizer Santicizer 278 (38 g) and Milliken "Ink Blue 92" polymeric dye (28.7 g). The components were melted together in an oven at 135° C. over 2 hours. After melting, the beaker was removed from the oven and placed in a temperature regulated heating mantle and stirred for 1 hour at about 110° C. To this stirred mixture was added 86 g of UNIREZ 2970 (a dimer acid-based tetraamide (TA) material manufactured by Union Camp) in several portions at a rate so as to avoid freezing the mixture. After addition of the TA was complete, the mixture was stirred at 110° C. for two (2) hours until the TA was completely dissolved. The molten phase change ink was filtered through a heated Mott apparatus (available from Mott Metallurgical) using #3 Whatman filter paper and a pressure of 15 psi. The filtered phase change ink was poured into molds and allowed to solidify to form solid ink sticks.

EXAMPLE 3

(Magenta Ink Using Polymeric Dye)

In a stainless steel beaker were combined KEMAMIDE S-180 stearyl stearamide (127.5 g), KE-311 resin (32.5 g), antioxidant N-445 (0.51 g), plasticizer Santicizer 278 (10.02 g) and Milliken Ink Red 357 polymeric dye (11.4 g). The components were melted together in an oven at 135° C. over 2 hours. After melting, the beaker was removed from the oven and placed in a temperature regulated heating mantle and stirred for 1 hour at about 110° C. To this stirred mixture was added 60.1 g of UNIREZ 2970 (a dimer acid-based tetraamide (TA) material manufactured by Union Camp) in several portions at a rate so as to avoid freezing the mixture. After addition of the TA was complete, the mixture was stirred at 110° C. for two (2) hours until the TA was completely dissolved. The molten phase change ink was filtered through a heated Mott apparatus (available from Mott Metallurgical) using #3 Whatman filter paper and a pressure of 15 psi. The filtered phase change ink was poured into molds and allowed to solidify to form ink sticks.

EXAMPLE 4

(Black Ink Using Polymeric Dye)

In a stainless steel beaker were combined KEMAMIDE S-180 stearyl stearamide (117.5 g), Arakawa KE-311 resin (57.5 g), antioxidant Naugard-445 (0.5 g), plasticizer Santicizer 278 (12.5 g) and Milliken Ink Black 8915-67 polymeric dye (60.0 g). The components were melted together in an oven at 135° C. over 2 hours. After melting, the beaker was removed from the oven and placed in a temperature regulated heating mantle and stirred for 1 hour at about 110° C. To this stirred mixture was added 308.3 g of UNIREZ 2970 (a dimer acid-based tetraamide (TA) material manufactured by Union Camp) in several portions at a rate so as to avoid freezing the mixture. After addition of the TA was complete, the mixture was stirred at 110° C. for two (2) hours until the TA was completely dissolved. The molten phase change ink was filtered through a heated Mott apparatus (available from Mott Metallurgical) using #3 Whatman filter paper and a pressure of 15 psi. The filtered phase change ink was poured into molds and allowed to solidify to form solid ink sticks.

EXAMPLE 5

(Magenta Ink Using a Mixture of Polymeric Dye and a Commercial Powdered Dye)

In a stainless steel beaker were combined KEMAMIDE S-180 stearyl stearamide (119 g), Arakawa KE-311 resin (53.6 g), antioxidant Naugard-445 (0.45 g), plasticizer Santicizer 278 (5.86 g), Milliken Ink Red 357 polymeric dye (2.51 g) and Solvent Red 49 (BASF) powdered dye (3.75 g). The components were melted together in an oven at 135° C. over 2 hours. After melting, the beaker was removed from the oven and placed in a temperature regulated heating mantle and stirred for 1 hour at about 110° C. To this stirred mixture was added 80.0 g of UNIREZ 2970 (a dimer acid-based tetraamide (TA) material manufactured by Union Camp) in several portions at a rate so as to avoid freezing the mixture. After addition of the TA was complete, the mixture was stirred at 110° C. for two (2) hours until the TA was completely dissolved. The molten phase change ink was filtered through a heated Mott apparatus (available from Mort Metallurgical) using #3 Whatman falter paper and a pressure of 15 psi. The filtered phase change ink was poured into molds and allowed to solidify to form solid ink sticks.

COMPARATIVE EXAMPLE 1

(Yellow Ink Using Powdered Dye)

A yellow comparison ink was prepared according to the procedure and ingredients set forth in Example 2 of U.S. Pat. No. 5,372,852 except that 1.40% by weight Neopen Yellow 075, (C.I. Solvent Yellow 162) was used as the powdered yellow dye instead of 2.00% by weight Orosol Yellow 4GN.

Having illustrated and described the principles of our invention in a preferred embodiment thereof, it should be readily apparent to those skilled in the art that the invention can be modified in arrangement and detail without departing from such principles. For example, the ink carrier composition to form the ink composition of the present invention can be a low viscosity semicrystalline or crystalline amide wax, an ester wax, a polyethylene wax, a microcrystalline wax or a paraffin in combination with a hydrocarbon or resin based amorphous material, or an oligomer, or low molecular weight polymer or copolymer, or a tackifier, or a plasticizer and combinations thereof. The polymeric dye colorant can be any polymeric dye compatible with said ink carrier composition. The combination of the ink carrier composition and polymeric dye can be used with either a direct or an indirect transfer printing process. We claim all modifications coming within the spirit and scope of the accompanying claims.

PRINT TESTING

The inks from Examples 1, 2, 3, and 4 above were placed in a Tektronix "Phaser III" printer employing direct ink-jet printing and test prints were made using the inks. The printer was found to print reliably with no print defects or artifacts. Prints made on both paper and overhead transparency were found to have excellent color saturation in both the primary and secondary colors.

In another printing test, the phase change ink formulation of Example 1 having a yellow polymeric dye was tested in a prototype phase change indirect transfer-type printer along with three different conventional ink compositions using powdered colorants, namely, cyan, black and magenta ink composition having the same ink carrier compositions and cyan, black and magenta dyes as in Example 2 of U.S. Pat. No. 5,372,852 except the magenta ink contained 1.75% Solvent Red 49 and 0.6% Solvent Red 172. The prototype printer was of the type described in U.S. Pat. No. 5,372,852 employing indirect transfer printing with a liquid intermediate transfer surface supported on a heated rotatable drum with a piezo electric type of print head and contact transfer of the printed image from the intermediate transfer surface to the final receiving substrate. This printer was also found to print reliably with no print defects or artifacts. All four ink compositions were found to work reliably and repeatably together in the indirect transfer process. Dynamic Mechanical Analysis (DMA) of Example 1 as described in the FIGURE showed that it fell within the acceptable range of properties for this process as defined above.

In a third printing test, the phase change ink formulation of Example 5 having a mixture of magenta polymeric and powdered dyes was tested in the same prototype phase change indirect transfer-type printer as in the second print test. The ink formulation of Example 5 was used with three different conventional ink compositions using different powdered colorants, namely, cyan, black and yellow powdered dyes as disclosed in Example 2 of U.S. Pat. No. 5,372,852 except the yellow ink contained 1.4% of C.I. Solvent Yellow 162. All four ink compositions were found to work reliably and repeatably together in this indirect transfer process. The print color of the mixed dye Example 5 with this prototype machine was found to be of higher saturation than could be achieved by the use of the powdered dye alone.

Prints from the above three print tests were measured in the manner as shown in Example 7 of U.S. Pat. No. 5,372,852 and were found to give color values of high chroma and lightness, comparable to the values listed in Table 1 of that Example.

Thermal Stability Testing

The ink from Example 1 above was heated for 400 hours in a glass beaker at 140° C. and was found to lose about 12% of the initial dye strength. This compares to a loss of about 75% of the dye strength of a Comparison ink of Comparative Example 1 above made with a commercially available powdered yellow dye (C.I. Solvent Yellow 162) in the same amount of time. Subsequent print testing of these aged inks showed a color change ($\Delta E$) of about 4 for Example 1 ink and about 20 for comparison Example 1, both compared to their fresh ink colors.

Compatibility Testing

The inks from Examples 1, 2, 3, 4 and 5 were found to be compatible one with another and with other inks made from powdered dyes when used in the printers mentioned above. No clogging of any of the orifices of the ink jet devices mentioned above was observed, even with multiple purging/wiping cycles on the machines or extended dwell time of the test inks in the printers.

No reaction occurred and no precipitates were formed among these inks on or around the print head surface during multiple normal purging cycles while the printer was in operation.

Durability Testing

The inks of Example 1 and Comparative Example 1 were tested for durability using the procedures set forth in U.S.

Pat. No. 5,372,852 using the prototype phase-change transfer-type printer described above in the Print Testing section. Both inks were found to have the same durability.

What is claimed is:

1. A phase change ink composition comprising a composition comprising a fatty amide-containing material, said fatty amide-containing material selected from the group consisting of a tetra-amide compound, a mono-amide compound and mixtures thereof, and a compatible colorant, said phase change ink composition being in a solid phase at ambient temperature and in a liquid phase at elevated operating temperature, said ink composition having a high degree of lightness and chroma, and being rectilinearly light transmissive in a thin film of substantially uniform thickness, wherein said colorant is selected from the group consisting of (1) an organic chromophoto having a polyoxyalkalene substituent and (2) an organic chromophore having a polyoxyalkylene substituent and a carboxylic acid or non-reactive ester or amide derivative thereof covalently bonded to the polyoxyalkylene substituent.

2. The ink composition of claim 1 wherein said colorant is an organic chromophore having a polyoxyalkylene substituent.

3. The ink composition of claim 1 wherein said colorant has the formula:

A—{Y—X—C(O)—R₁—C(O)OH}ₚ where A is an organic chromophore; Y is a polyoxyalkylene substituent having from 1 to 200 alkylene oxide radicals of $C_{2-18}$ alkylene oxides; X is a nucleophile selected from O, $NR_2$, and S, where $R_2$ is H or $C_{1-18}$ alkyl; $R_1$ is selected from alkylene, alkenylene, phenylene, and phenylenealkylene which may optionally be substituted with alkyl, aryl or alkenyl, provided that the total number of carbon atoms is between 2 and 30; and p is an integer from 1 to 6.

4. The ink composition of claim 3 wherein A is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, azamethine or indigoid chromophore groups.

5. The ink composition of claim 4 wherein Y comprises from a total of from 3 to 50 of said alkylene oxide radicals and said alkylene oxides are selected from ethylene oxide and propylene oxide.

6. The ink composition of claim 5 wherein $R_1$ is selected from ethylene, vinylerie and phenylene, any of which may optionally be alkyl or alkenyl substituted.

7. The ink composition of claim 3 wherein A is selected from azo, methine, triphenylmethane and anthraquinone chromophores.

8. The ink composition of claim 7 wherein $R_1$ is selected from ethylene, vinylene and phenylene, any of which may optionally be alkyl or alkenyl substituted.

9. The ink composition of claim 8 wherein Y comprises from a total of from 3 to 50 of said alkylene oxide radicals and said alkylene oxides are selected from ethylene oxide and propylene oxide and p is 1 to 4.

10. The phase change ink composition of claim 1 wherein the $C_{ab}^*$ value of a substantially uniform thin film of about 5–20 micron thickness, of a subtractive primary yellow color phase change ink composition produced from said carrier composition, is at least about 40.

11. The phase change ink composition of claim 1 wherein the $C_{ab}^*$ value of a substantially uniform thin film of about 5–20 micron thickness, of a subtractive primary magenta color phase change ink composition produced from said carrier composition, is at least about 50.

12. The phase change ink carrier composition of claim 1, wherein the $C_{ab}^*$ value of a substantially uniform thin film of about 5–20 micron thickness, of a subtractive primary cyan color phase change ink composition produced from said carrier composition, is at least about 30.

13. The phase change ink carrier composition of claim 1, wherein the $L^*$ value of a substantially uniform thin film of about 5–20 micron thickness, of a black color phase change ink composition produced from said carrier composition, is not more than about 35.

14. A selective phase change ink composition, which comprises a phase change ink colorant composition and a modified phase change ink carrier composition, said selective phase change ink composition having (a) fluidic and mechanical properties which meet the parameters needed for indirect application via an intermediate transfer surface to a final receiving substrate, (b) a compressive yield strength which will allow the ink to flow in a ductile manner when external compressive forces are applied thereto, and sufficient internal cohesive strength to resist failure when the ink is fixed to said substrate, (c) a high degree of ductility on said substrate after said transfer and fixing, and (d) a high degree of lightness and chroma for thin films of uniform thickness thereof, and said phase change colorant composition selected from the group consisting of (1) an organic chromophore having a polyoxyalkylene substituent and (2) an organic chromophoto having a polyoxyalkylene substituent and a carboxylic acid or non-reactive ester or amide derivative thereof covalently bonded to the polyoxyalkylene substituent.

15. The ink composition of claim 14 wherein said colorant composition is an organic chromophore having a polyoxyalkylene substituent.

16. The ink composition of claim 14 wherein said colorant composition has the formula:

A—{Y—X—C(O)—R₁—C(O)OH}ₚ where A is an organic chromophore; Y is a polyoxyalkylene substituent having from 1 to 200 alkylene oxide radicals of $C_{2-18}$ alkylene oxides; X is a nucleophile selected from O, $NR_2$ and S, where $R_2$ is H or $C_{1-18}$ alkyl; $R_1$ is selected from alkylene, alkenylene, phenylene and phenylenealkylene which may optionally be substituted with alkyl, aryl or alkenyl, provided that the total number of carbon atoms is between 2 and 30; and p is an integer from 1 to 6.

17. The ink composition of claim 14, wherein the phase change ink composition has a temperature range for the glassy region of E' from about −100 to about 40 degrees C, the value of E' being from about $1.5 \times 10^9$ to about $1.5 \times 10^{11}$ dynes/cm² at a desired testing frequency.

18. The ink composition of claim 14, wherein the phase change ink composition has a temperature range for the transition region of E' from about −50 to about 60 degrees C.

19. The ink composition of claim 14, wherein the phase change ink composition has a temperature range for the rubbery region of E' from about −10 to about 100 degrees C, the value of E' being from about $1.0 \times 10^6$ to about $1.0 \times 10^{11}$ dynes/cm² at a desired testing frequency.

20. The ink composition of claim 14, wherein the phase change ink composition has a temperature range for the terminal region of E' from about 30 to about 160 degrees C.

21. The ink composition of claim 14, wherein the $L^*$ value of a substantially uniform thin film of about 5–20 micron thickness of a black color of a phase change ink composition produced from said phase change ink composition is not more than about 35.

22. The ink composition of claim 14, wherein the thin films of uniform thickness of said phase change ink composition are rectilinearly light transmissive.

23. The ink composition of claim 14, wherein $C_{ab}^*$ value, of a substantially uniform thin film of about 5–20 micron thickness of a subtractive primary yellow color phase change ink composition produced from said phase change ink composition is at least about 40, of a subtractive primary magenta color phase change ink composition produced from said phase change ink composition is at least about 50, of a subtractive primary cyan color modified phase change ink composition produced from said colorant composition is at least about 30.

24. The ink composition of claim 14, wherein the glass transition temperature range of the phase change ink composition is from about −40 to about 40 degrees C.

25. The ink composition of claim 14, wherein the temperature range for the area under the tan δ peak of the phase change ink composition is from about −80 to about 80 degrees C. with an integration area range from about 5 to about 40.

26. The ink composition of claim 14, wherein the $L^*$ value of a substantially uniform thin film of about 5–20 micron thickness of said phase change ink composition without colorant, is at least about 65.

27. The ink composition of claim 14, wherein the temperature range for the peak value of tan δ of the phase change ink is from about −40 to about 40 degrees C. with a tan δ of from about 0.01 to about 10 at peak.

28. The ink composition of claim 14 wherein under nonprocess conditions, prior to raising the temperature of said selective phase change ink composition to a first elevated operating temperature or subsequent to forming a printed substrate, the yield stress value (YS), according to the equation YS=mT+I, comprises a value as defined by m is from about −9±−2 psi/degrees C. to about −36±−2 psi/degrees C; T is from about 10 to 60 degrees C.; and I is from about 800±100 psi to 2200±100 psi.

29. The composition of claim 28, wherein m is about −30±−2 psi/degrees C. and I is about 1700±100 psi.

30. The composition of claim 14, wherein under process conditions, from raising the temperature of said selective phase change ink composition to a first elevated operating temperature to forming a printed substrate, the yield stress value (YS), according to the equation YS=mT+I, comprises a value as defined by m which is from about −6±−2 psi/degrees C. to about −36±−2 psi/degrees C.; T is from about 40 to about 80 degrees C.; and I is from about 800±100 psi to about 1600±psi.

31. The composition of claim 30, wherein m is about −9±−2 psi/degrees C. and I is about 950±100 psi.

32. The ink composition of claim 16 wherein A is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, azamethine or indigoid chromophore groups.

33. The ink composition of claim 32 wherein Y comprises from a total of from 3 to 50 of said alkylene oxide radicals and said alkylene oxides are selected from ethylene oxide and propylene oxide.

34. The ink composition of claim 33 wherein $R_1$ is selected from ethylene, vinylene and phenylene, any of which may optionally be alkyl or alkenyl substituted.

35. The ink composition of claim 16, wherein A is selected from azo, methine, triphenylmethane, and anthraquinone chromophores.

36. The ink composition of claim 35, wherein $R_1$ is selected from ethylene, vinylene, and phenylene, any of which may optionally be alkyl or alkenyl substituted.

37. The ink composition of claim 36, wherein Y comprises from a total of from 3 to 50 of said alkylene oxide radicals and said alkylene oxides are selected from ethylene oxide and propylene oxide and p is 1 to 4.

38. An ink composition suitable for use with an ink jet printhead comprising at least a colorant and an ink carrier composition, the ink composition being characterized by having a temperature range in the rubbery region of E' from about −10 to about 100 degrees C., a value of E' of from about $1.0 \times 10^6$ to about $1.0 \times 10^{11}$ dynes per square centimeter at a desired testing frequency and a glass transition temperature range of from about −40 to about 40 degrees C., where E' is determined by the equation E'=σ$_o$/ε$_o$ (Cos δ; wherein said colorant is selected from the group consisting of (1) an organic chromophore having an polyoxyalkylene substituent and (2) an organic chromophore having a polyoxyalkylene substituent and a carboxylic acid or non-reactive derivative thereof covalently bonded to the polyoxyalkylene substituent.

39. The ink composition of claim 38 wherein said colorant is an organic chromophore having a polyoxyalkylene substituent.

40. The ink composition of claim 38 wherein said colorant has the formula:

where A is an organic chromophore; Y is a polyoxyalkylene substituent having from 1 to 200 alkylene oxide radicals of $C_{2-18}$ alkylene oxides; X is a nucleophile selected from O, $NR_2$ and S, where $R_2$ is H or $C_{1-18}$ alkyl; $R_1$ is selected from alkylene, alkenylene, phenylene and phenylenealkylene which may optionally be substituted with alkyl, aryl or alkenyl, provided that the total number of carbon atoms is between 2 and 30; and p is an integer from 1 to 6.

41. The ink composition according to claim 38, wherein the ink carrier composition is selected one from the group consisting of a low viscosity semicrystalline or crystalline amide wax, an ester wax, a polyethylene wax, a microcrystalline wax, and paraffin in combination with a hydrocarbon or resin based amorphous material, or an oligomer, or a low molecular weight polymer or copolymer, or a tackifier, or a plasticizer and combinations thereof.

42. The ink composition according to claim 38, wherein under non-process conditions, prior to raising the temperature of said selective phase change ink composition to a first elevated operating temperature or subsequent to forming a printed substrate, the yield stress value (YS), according to the equation YS=mT+I, comprises a value as defined by m which is from about −9±−2 psi/degrees C. to about −36±−2 psi/degrees C.; T is from about 10 to 60 degrees C.; and I is from about 800±100 psi to 2200±100 psi.

43. The ink composition according to claim 38, wherein under process conditions from raising the temperature of said selective phase change ink composition to a first elevated operating temperature to forming a printed substrate, the yield stress value (YS), according to the equation YS=mT+I, comprises a value as defined by m which is from about −6±−2 psi. degrees C. to about −36±−2 psi.degrees C.; T is from about 40 to about 80 degrees C.; and I is from about 800±100 psi to about 1600±100 psi.

44. The ink composition of claim 40 wherein A is selected from nitroso, nitro, azo, diarylmethane, triarylmethane, xanthene, acridine, quinoline, methine, thiazole, indamine, indophenol, lactone, aminoketone, hydroxyketone, stilbene, azine, oxazine, thiazine, anthraquinone, phthalocyanine, azamethine or indigoid chromophore groups.

45. The ink composition of claim 44 wherein Y comprises from a total of from 3 to 50 of said alkylene oxide radicals and said alkylene oxides are selected from ethylene oxide and propylene oxide.

46. The ink composition of claim 45 wherein $R_1$ is selected from ethylene, vinylene and phenylene, any of which may optionally be alkyl or alkenyl substituted.

47. The ink composition of claim 46 wherein $R_1$ is selected from ethylene, vinylene and phenylene, any which may optionally be alkyl or alkenyl substituted.

48. The ink composition of claim 47 wherein Y comprises from a total of from 3 to 50 of said alkylene oxide radicals and said alkylene oxides are selected from ethylene oxide and propylene oxide and p is 1 to 4.

49. A phase change ink composition comprising a composition comprising a fatty amide-containing material, said fatty amide-containing material comprising a tetra-amide compound and a mono-amide compound, and a compatible colorant, said phase change ink composition being in a solid phase at ambient temperature and in a liquid phase at elevated operating temperature, said ink composition having a high degree of lightness and chroma, and being rectilinearly light transmissive in a thin film of substantially uniform thickness, wherein said colorant comprises at least one polymeric dye.

50. A selective phase change ink composition, which comprises a phase change ink colorant composition and a modified phase change ink carrier composition, said selective phase change ink composition having (a) predetermined fluidics and mechanical properties which meet the parameters needed indirect application via an intermediate transfer surface to a final receiving substrate, where it is transferred and fixed onto a substrate to form a printed substrate, (b) a compressive yield strength which will allow the ink to flow in a ductile manner when external compressive forces are applied thereto, and sufficient internal cohesive strength to resist failure when the ink is fixed to said substrate, (c) a high degree of ductility on said substrate after said transfer and fixing, and (d) a high degree of lightness and chroma for thin films of uniform thickness thereof, wherein said colorant comprises at least one polymeric dye.

51. A phase change ink composition comprising a phase change ink carrier compositions comprising a tetra-amide compound and a mono-amide compound and a compatible colorant, said ink composition being solid phase at ambient temperature and in a liquid phase at elevated operating temperature, and having a high degree of lightness and chroma and being rectilinearly light transmissive in thin films of substantially uniform thickness, wherein the $C_{ab}^*$ value of a substantially uniform thin film of about 5–20 micron thickness, of subtractive primary Yellow, magenta and cyan color phase change ink compositions are at least about 40 for said yellow ink composition, at least about 50 for said magenta ink composition, and at least about 30 for said cyan ink composition, and wherein the $L^*$ value of a substantially uniform thin film to about 5–20 micron thickness, of a black color phase change ink is not more than about 35, wherein said colorant comprises at least one polymeric dye.

52. An ink composition suitable for use with an ink jet printhead comprising at least a colorant and an ink carrier composition, the ink composition being characterized by having a temperature range in the rubbery region of E' from about −10 to about 100 degrees C., a value of E' of from about $1.0 \times 10^6$ to about $1.0 \times 10^{11}$ dynes per square centimeter at a desired testing frequency and a glass transition temperature range temperature of from about −40 to about 40 degrees C., where E' is determined by the equation $E' = \sigma_o/\epsilon_o (\cos \delta)$ wherein said colorant is comprised at least one polymeric dye.

* * * * *

UNITED STATES PATENT AND TRADEMARK OFFICE
CERTIFICATE OF CORRECTION

PATENT NO. : 5,621,022
DATED : April 15, 1997
INVENTOR(S) : C. Wayne Jaeger, Loc V. Bui, Donald R. Titterington, Clifford R. King It is certified that error appears in the above-indentified patent and that said Letters Patent is hereby corrected as shown below:

Claim 1, line 15 - after "organic," change "chromophoto" to --chromophore--;

Claim 3, line 34, after "with" and before "provided" change "alkyl, aryl or alkenyl," to --alkylaryl or alkenyl--;

Claim 16, line 46, after "with" and before "provided" change "alkyl, aryl or alkenyl," to --alkylaryl or alkenyl--;

Claim 38, line 19, change "(Cos δ" to --(Cos δ)--;

Claim 40, line 39, after "with" and before "provided" change "alkyl, aryl or alkenyl," to --alkylaryl or alkenyl--;

Claim 51, line 31, change "$C_{ab}^*$" to --$C^*_{ab}$--.

Signed and Sealed this

Thirtieth Day of September, 1997

Attest:

BRUCE LEHMAN

*Attesting Officer*  *Commissioner of Patents and Trademarks*